US008830828B2

United States Patent
Guo et al.

(10) Patent No.: US 8,830,828 B2
(45) Date of Patent: Sep. 9, 2014

(54) METHOD AND APPARATUS TO PREVENT RAN (RADIO ACCESS NETWORK) OVERLOAD FOR LEGACY NETWORKS IN A WIRELESS COMMUNICATION SYSTEM

(75) Inventors: Yu-Hsuan Guo, Taipei (TW); Meng-Hui Ou, Taipei (TW)

(73) Assignee: Innovative Sonic Corporation, Taipei (TW)

( * ) Notice: Subject to any disclaimer, the term of this patent is extended or adjusted under 35 U.S.C. 154(b) by 98 days.

(21) Appl. No.: 13/484,749

(22) Filed: May 31, 2012

(65) Prior Publication Data

US 2012/0307632 A1 Dec. 6, 2012

Related U.S. Application Data

(60) Provisional application No. 61/491,479, filed on May 31, 2011, provisional application No. 61/604,768, filed on Feb. 29, 2012.

(51) Int. Cl.

| | |
|---|---|
| ***H04J 1/16*** | (2006.01) |
| ***H04W 48/06*** | (2009.01) |
| *H04W 28/02* | (2009.01) |
| *H04B 7/04* | (2006.01) |

(52) U.S. Cl.
CPC ...... *H04W 28/0205* (2013.01); *H04W 28/0215* (2013.01); *H04W 28/0289* (2013.01); *H04W 48/06* (2013.01); *H04B 7/0413* (2013.01)
USPC ........................... 370/230; 370/235; 370/447

(58) Field of Classification Search
USPC ......................................... 370/230, 235, 447
See application file for complete search history.

(56) References Cited

U.S. PATENT DOCUMENTS

| | | | | |
|---|---|---|---|---|
| 2011/0274040 | A1 * | 11/2011 | Pani et al. | 370/328 |
| 2012/0039171 | A1 * | 2/2012 | Yamada et al. | 370/232 |
| 2012/0063305 | A1 * | 3/2012 | Chiu et al. | 370/230 |
| 2012/0281531 | A1 * | 11/2012 | Susitaival | 370/230 |

* cited by examiner

*Primary Examiner* — Sai-Ming Chan
(74) *Attorney, Agent, or Firm* — Blue Capital Law Firm, P.C.

(57) ABSTRACT

A method and apparatus are disclosed to prevent RAN (Radio Access Network) overload for legacy networks in a wireless communication system. In one embodiment, the method comprise initiating a RRC (Radio Resource Control) connection establishment procedure to access a cell. The method further comprises performing an access barring check. The method also comprises extending a barring time autonomously.

20 Claims, 12 Drawing Sheets

900

Start

905 Initiating a RRC connection re-establishment procedure

910 Selecting a cell to broadcast EAB information

915 Broadcasting, from the selected cell, EAB information

920 Applying the broadcasted EAB information during the RRC connection re-establishment procedure Return

METHOD AND APPARATUS TO PREVENT RAN (RADIO ACCESS NETWORK) OVERLOAD FOR LEGACY NETWORKS IN A WIRELESS COMMUNICATION SYSTEM

CROSS-REFERENCE TO RELATED APPLICATIONS

The present Application claims the benefit of U.S. Provisional Patent Application Ser. No. 61/491,479 filed on May 31, 2011, and U.S. Provisional Patent Application Ser. No. 61/604,768 filed on Feb. 29, 2012, the entire disclosures of which are incorporated herein by reference.

FIELD

This disclosure generally relates to wireless communication networks, and more particularly, to a method and apparatus to prevent RAN (Radio Access Network) overload for legacy networks in a wireless communication system.

BACKGROUND

With the rapid rise in demand for communication of large amounts of data to and from mobile communication devices, traditional mobile voice communication networks are evolving into networks that communicate with Internet Protocol (IP) data packets. Such IP data packet communication can provide users of mobile communication devices with voice over IP, multimedia, multicast and on-demand communication services.

An exemplary network structure for which standardization is currently taking place is an Evolved Universal Terrestrial Radio Access Network (E-UTRAN). The E-UTRAN system can provide high data throughput in order to realize the above-noted voice over IP and multimedia services. The E-UTRAN system's standardization work is currently being performed by the 3GPP standards organization. Accordingly, changes to the current body of 3GPP standard are currently being submitted and considered to evolve and finalize the 3GPP standard.

SUMMARY

A method and apparatus are disclosed to prevent RAN (Radio Access Network) overload for legacy networks in a wireless communication system. In one embodiment, the method comprise initiating a RRC (Radio Resource Control) connection establishment procedure to access a cell. The method further comprises performing an access barring check. The method also comprises extending a barring time autonomously.

DETAILED DESCRIPTION

The exemplary wireless communication systems and devices described below employ a wireless communication system, supporting a broadcast service. Wireless communication systems are widely deployed to provide various types of communication such as voice, data, and so on. These systems may be based on code division multiple access (CDMA), time division multiple access (TDMA), orthogonal frequency division multiple access (OFDMA), 3GPP LTE (Long Term Evolution) wireless access, 3GPP LTE-A or LTE-Advanced (Long Term Evolution Advanced), 3GPP2 UMB (Ultra Mobile Broadband), WiMax, or some other modulation techniques.

In particular, the exemplary wireless communication systems devices described below may be designed to support one or more standards such as the standard offered by a consortium named "3rd Generation Partnership Project" referred to herein as 3GPP, including Document Nos. RP-100330. "Revised SID: RAN Improvements for Machine-type Communications"; TS 22.011 V10.3.0. "Service accessibility": R2-113339. "Further Discussion on EAB": TS 36.331 V10.1.0. "RRC protocol specification (Release 10)"; TS 36.331 V10.4.0, "RRC protocol specification (Release 10)"; TS 22.368 V11.1.0, "Service Requirement for Machine-type Communications (Release 11)"; RP-111373, "New WI proposal: RAN overload control for Machine-Type Communications"; and TR 37.868 V11.0.0, "Study on RAN Improvements for Machine-Type Communications". The standards and documents listed above are hereby expressly incorporated herein.

Figure 1:
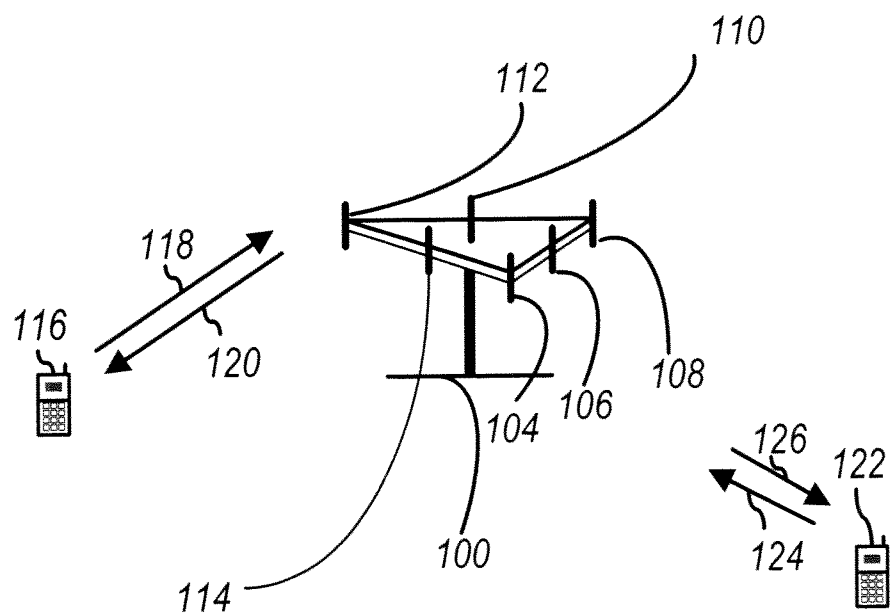
FIG. 1 shows a diagram of a wireless communication system according to one exemplary embodiment.

FIG. 1 shows a multiple access wireless communication system according to one embodiment of the invention. An access network 100 (AN) includes multiple antenna groups, one including 104 and 106, another including 108 and 110, and an additional including 112 and 114. In FIG. 1, only two antennas are shown for each antenna group, however, more or fewer antennas may be utilized for each antenna group. Access terminal 116 (AT) is in communication with antennas 112 and 114, where antennas 112 and 114 transmit information to access terminal 116 over forward link 120 and receive information from access terminal 116 over reverse link 118. Access terminal (AT) 122 is in communication with antennas 106 and 108, where antennas 106 and 108 transmit information to access terminal (AT) 122 over forward link 126 and receive information from access terminal (AT) 122 over reverse link 124. In a FDD system, communication links 118, 120, 124 and 126 may use different frequency for communication. For example, forward link 120 may use a different frequency then that used by reverse link 118.

Each group of antennas and/or the area in which they are designed to communicate is often referred to as a sector of the access network. In the embodiment, antenna groups each are designed to communicate to access terminals in a sector of the areas covered by access network 100.

In communication over forward links 120 and 126, the transmitting antennas of access network 100 may utilize beamforming in order to improve the signal-to-noise ratio of forward links for the different access terminals 116 and 122. Also, an access network using beamforming to transmit to access terminals scattered randomly through its coverage causes less interference to access terminals in neighboring cells than an access network transmitting through a single antenna to all its access terminals.

An access network (AN) may be a fixed station or base station used for communicating with the terminals and may also be referred to as an access point, a Node B, a base station, an enhanced base station, an eNodeB, or some other terminology. An access terminal (AT) may also be called user equipment (UE), a wireless communication device, terminal, access terminal or some other terminology.

Figure 2:
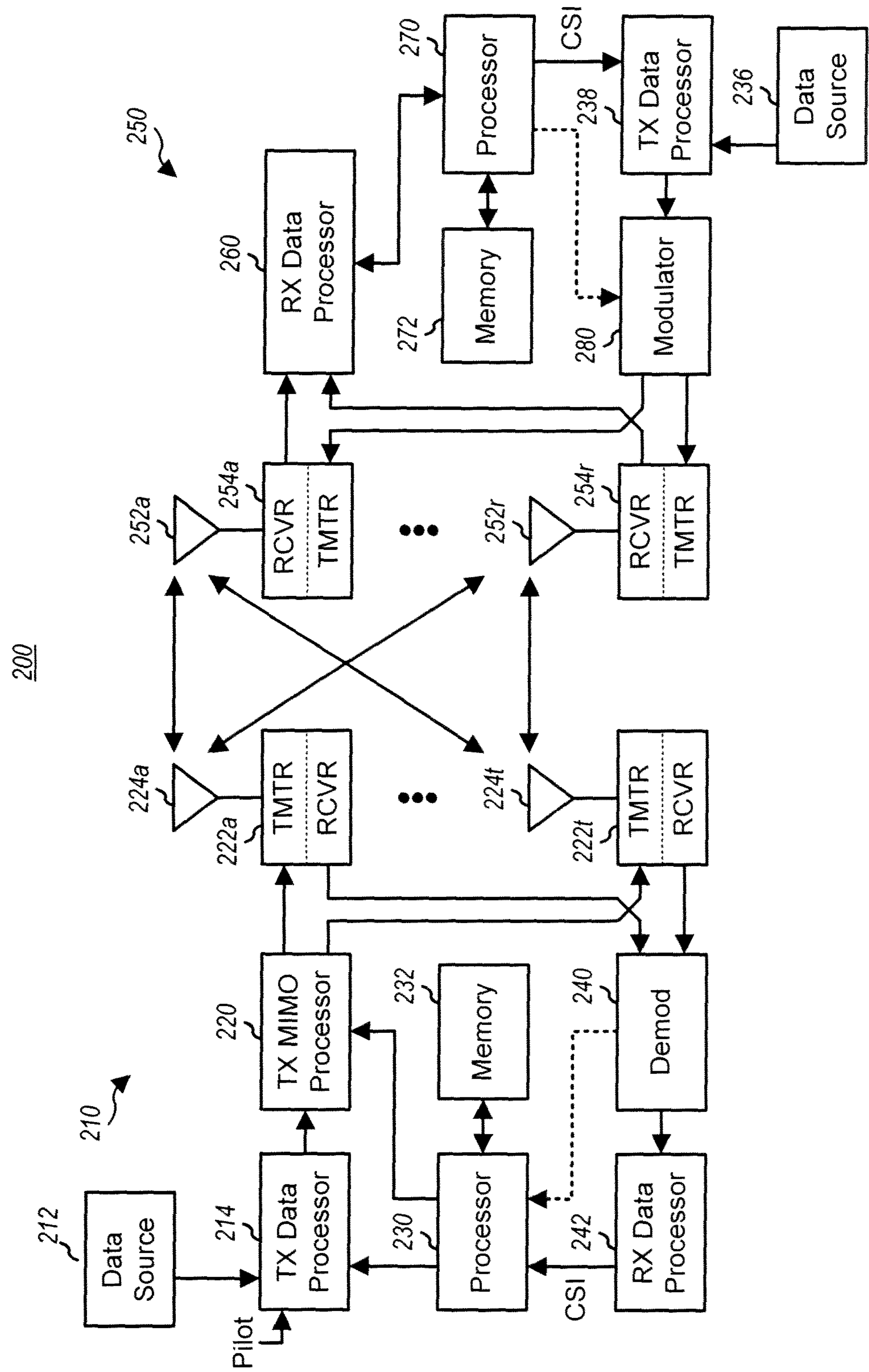
FIG. 2 is a block diagram of a transmitter system (also known as access network) and a receiver system (also known as user equipment or UE) according to one exemplary embodiment.

FIG. 2 is a simplified block diagram of an embodiment of a transmitter system 210 (also known as the access network) and a receiver system 250 (also known as access terminal (AT) or user equipment (UE)) in a MIMO system 200. At the transmitter system 210, traffic data for a number of data streams is provided from a data source 212 to a transmit (TX) data processor 214.

In one embodiment, each data stream is transmitted over a respective transmit antenna. TX data processor 214 formats, codes, and interleaves the traffic data for each data stream based on a particular coding scheme selected for that data stream to provide coded data.

The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (i.e. symbol mapped) based on a particular modulation scheme (e.g., BPSK, QPSK, M-PSK, or M-QAM) selected for that data stream to provide modulation symbols. The data rate, coding, and modulation for each data stream may be determined by instructions performed by processor 230.

The modulation symbols for all data streams are then provided to a TX MIMO processor 220, which may further process the modulation symbols (e.g., for OFDM). TX MIMO processor 220 then provides $N_T$ modulation symbol streams to $N_T$ transmitters (TMTR) 222*a* through 222*t*. In certain embodiments. TX MIMO processor 220 applies beamforming weights to the symbols of the data streams and to the antenna from which the symbol is being transmitted.

Each transmitter 222 receives and processes a respective symbol stream to provide one or more analog signals, and further conditions (e.g., amplifies, filters, and upconverts) the analog signals to provide a modulated signal suitable for transmission over the MIMO channel. $N_T$ modulated signals from transmitters 222*a* through 222*t* are then transmitted from $N_T$ antennas 224*a* through 224*t*, respectively.

At receiver system 250, the transmitted modulated signals are received by $N_R$ antennas 252*a* through 252*r* and the received signal from each antenna 252 is provided to a respective receiver (RCVR) 254*a* through 254*r*. Each receiver 254 conditions (e.g. filters, amplifies, and downconverts) a respective received signal, digitizes the conditioned signal to provide samples, and further processes the samples to provide a corresponding "received" symbol stream.

An RX data processor 260 then receives and processes the $N_R$ received symbol streams from $N_R$ receivers 254 based on a particular receiver processing technique to provide $N_T$ "detected" symbol streams. The RX data processor 260 then demodulates, deinterleaves, and decodes each detected symbol stream to recover the traffic data for the data stream. The processing by RX data processor 260 is complementary to that performed by TX MIMO processor 220 and TX data processor 214 at transmitter system 210.

A processor 270 periodically determines which pre-coding matrix to use (discussed below). Processor 270 formulates a reverse link message comprising a matrix index portion and a rank value portion.

The reverse link message may comprise various types of information regarding the communication link and/or the received data stream. The reverse link message is then processed by a TX data processor 238, which also receives traffic data for a number of data streams from a data source 236, modulated by a modulator 280, conditioned by transmitters 254*a* through 254*r*, and transmitted back to transmitter system 210.

At transmitter system 210, the modulated signals from receiver system 250 are received by antennas 224, conditioned by receivers 222, demodulated by a demodulator 240, and processed by a RX data processor 242 to extract the reserve link message transmitted by the receiver system 250. Processor 230 then determines which pre-coding matrix to use for determining the beamforming weights then processes the extracted message.

Figure 3:
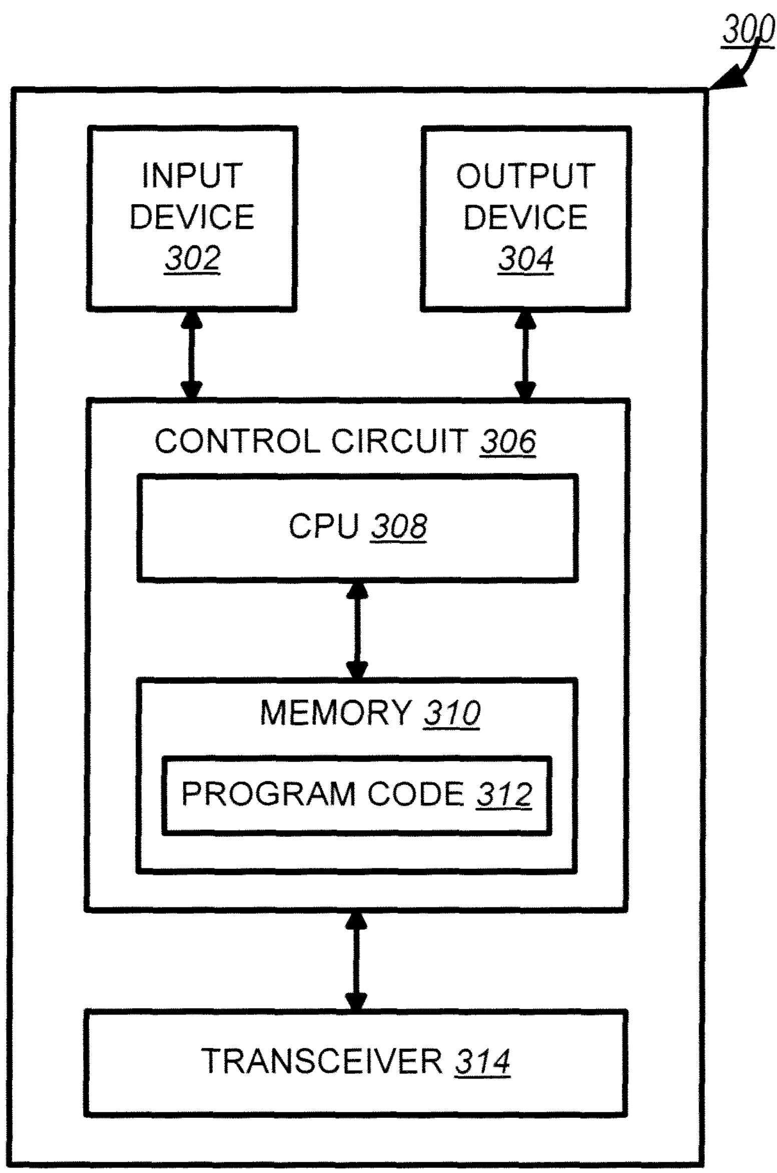
FIG. 3 is a functional block diagram of a communication system according to one exemplary embodiment.

Turning to FIG. 3, this figure shows an alternative simplified functional block diagram of a communication device according to one embodiment of the invention. As shown in FIG. 3, the communication device 300 in a wireless communication system can be utilized for realizing the UEs (or ATs) 116 and 122 in FIG. 1, and the wireless communications system is preferably the LTE system. The communication device 300 may include an input device 302, an output device 304, a control circuit 306, a central processing unit (CPU) 308, a memory 310, a program code 312, and a transceiver 314. The control circuit 306 executes the program code 312 in the memory 310 through the CPU 308, thereby controlling an operation of the communications device 300. The communications device 300 can receive signals input by a user through the input device 302, such as a keyboard or keypad, and can output images and sounds through the output device 304, such as a monitor or speakers. The transceiver 314 is used to receive and transmit wireless signals, delivering received signals to the control circuit 306, and outputting signals generated by the control circuit 306 wirelessly.

Figure 4:
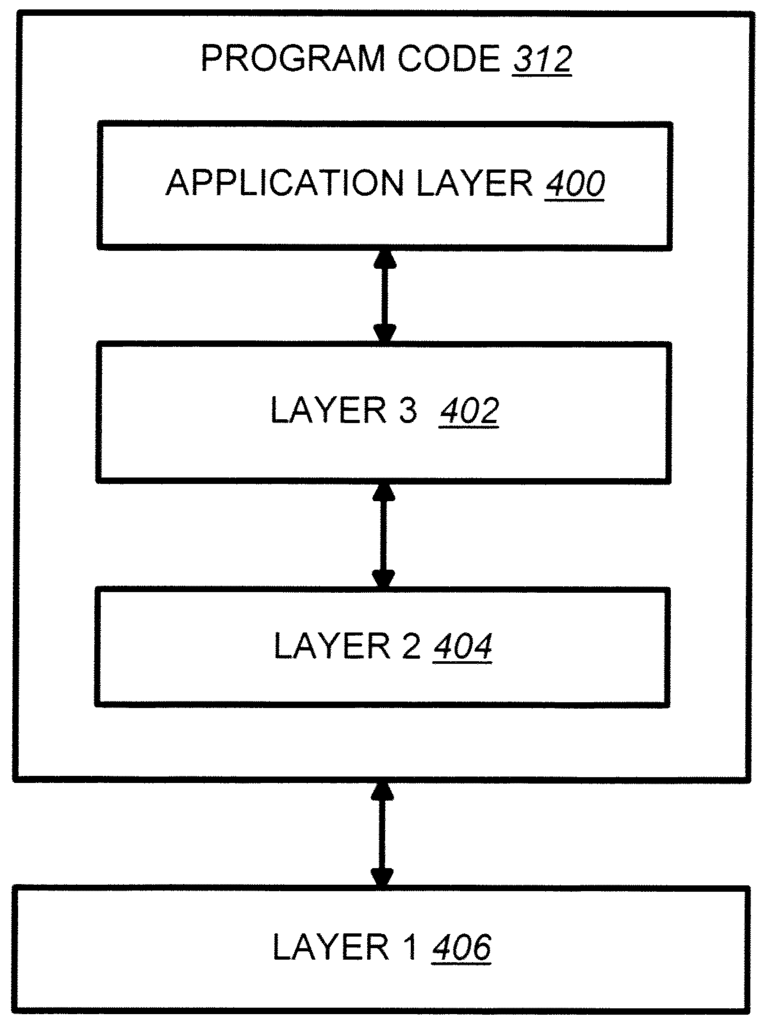
FIG. 4 is a functional block diagram of the program code of FIG. 3 according to one exemplary embodiment.

FIG. 4 is a simplified block diagram of the program code 312 shown in FIG. 3 in accordance with one embodiment of the invention. In this embodiment, the program code 312 includes an application layer 400, a Layer 3 portion 402, and a Layer 2 portion 404, and is coupled to a Layer 1 portion 406. The Layer 3 portion 402 generally performs radio resource control. The Layer 2 portion 404 generally performs link control. The Layer 1 portion 406 generally performs physical connections.

As seen in 3GPP RP-100330, the discussion of the study item "RAN improvements for Machine Type communication" is resumed for LTE and UMTS Rel-11. The justification and objectives of the study item can be found in 3GPP RP-100330. The objective of the study item focuses generally on preventing RAN overload situation caused by the access from a large amount of MTC (Machine Type Communication) UEs. The following exemplary scenarios of RAN overload for MTC have been identified:

Roaming scenario when many MTC devices are roamers and their serving network fails. In this case, the roaming MTC devices could almost simultaneously move onto the local competing network(s), potentially leading to RAN overload conditions in such network(s).

Scenarios (such as MTC server/application malfunctioning) when some external event triggers massive numbers of MTC devices to try to access the network in an almost synchronized manner.

It has been agreed to use Extended Access Barring (EAB) as a baseline solution to RAN overload for MTC. As discussed in 3GPP TS 22.011 V 10.3.0. EAB is introduced to prevent overload in GERAN Rel-10. In general, EAB is a mechanism for the operator(s) to control Mobile Originating access attempts from UEs that are configured for EAB in order to prevent overload of the access network and/or the core network. In congestion situations, the operator could restrict access from UEs configured for EAB while permitting access from other UEs. UEs configured for EAB are considered more tolerant to access restrictions than other UEs. When an operator determines that it is appropriate to apply EAB, the network would broadcast necessary information to provide EAB control for UEs in a specific area.

Based on 3GPP R2-113339, the following agreements were made in the RAN2 #74 meeting:

The UE somehow knows whether at a certain RRC (Radio Resource Control) connection establishment it needs to apply EAB or not.

BCCH (Broadcast Control Channel) broadcasts EAB information.

EAB information on BCCH indicates which "category" of UEs configured with EAB would apply EAB.

UEs configured with EAB check their categories (such as category a, b, or c) in order to decide whether or not to apply EAB.

If UE establishing the RRC connection for emergency call, UE configured with EAB would apply no EAB.

For Further Study (FFS), if LTE has a special Access Class (AC), such as AC 11-15. UE configured with EAB would apply Rel-10 ACB (depending on case by case connection establishment).

If UE has no special AC, UE configured EAB would apply EAB for non-emergency calls.

If EAB information is not available on BCCH. UEs configured with EAB would apply no EAB, but would apply Rel-10 ACB (Access Class Barring).

The details of current operation of access barring or access class barring (ACB) can be found in 3GPP TS 36.331 V10.1.0. The check of access barring or access class barring is performed upon the initiation of a RRC connection establishment procedure. Currently, the delay-tolerant access is mainly used for the purpose of MTC.

In addition, as seen in 3GPP RP-111373, the discussion of the work item "New WI proposal: RAN overload control for Machine-Type Communications" is for LTE and UMTS Rel-11. According to 3GPP RP-111373, some of the justifications and objectives of the work item are as follows:

A large number of MTC devices are expected to be deployed in a specific area thus the network has to face increased load as well as possible surges of MTC traffic. Radio network congestion may happen due to the mass concurrent data and signaling transmission. This may cause intolerable delays, packet loss or even service unavailability.

RAN level mechanisms to guarantee network availability and help network to meet performance requirements under such MTC load need to be investigated and specified.

The objective of the work item is for both UMTS and LTE to specify Extended Access Barring mechanisms for RAN overload control. The EAB mechanism should be suitable for but not limited to Machine-Type Communications.

3GPP TR 37.868 V11.0.0 generally specifies the output of the study item discussed in 3GPP RP-111373. In particular, 3GPP TR 37.868 V11.0.0 provides a brief description of the EAB mechanism as follows:

Extended Access Barring (EAB) is generally a method for the network to selectively control access attempts from "UEs configured for EAB" (which are considered more tolerant to access restrictions than other UEs) in order to prevent overload of the access network and/or the core network, without the need to introduce any new Access Classes. In case of congestion, the network could restrict access from "UEs configured for EAB" while permitting access from other UEs. When the network determines that it is appropriate to apply EAB, the network would broadcasts necessary information on the BCCH to provide EAB control for UEs. In the case of multiple core networks sharing the same access network, EAB information could be PLMN specific.

EAB enforcement will be implemented in the UE AS (Access Stratum) layer and interwork with legacy Access Class Barring.

When many MTC devices try to access the network, currently there is no rule to prioritize the network supporting EAB. In this situation, networks (e.g., the legacy networks) that do not supporting EAB may still have the problem of RAN overload.

In the RAN2 #74 meeting, it was agreed that if EAB information is not available on BCCH. UEs configured with EAB would apply no EAB, but would apply Rel-10 ACB. However, Rel-10 ACB does not seem to be sufficient to handle the RAN overload due to MTC. In order to solve the RAN overload for the network(s) that do not supporting EAB, there should be some solution which is not dependent on the network(s).

Furthermore, there may be two possible cases in which EAB information is not available on BCCH: one case is that the cell doesn't support EAB, and the other is that the cell supports EAB but there is no current need to broadcast EAB information. If the UE could not differentiate the two cases, the solution (independent of the network) may cause some unnecessary delay in the case in which the cell supports EAB but does not broadcast EAB information.

Figure 5:
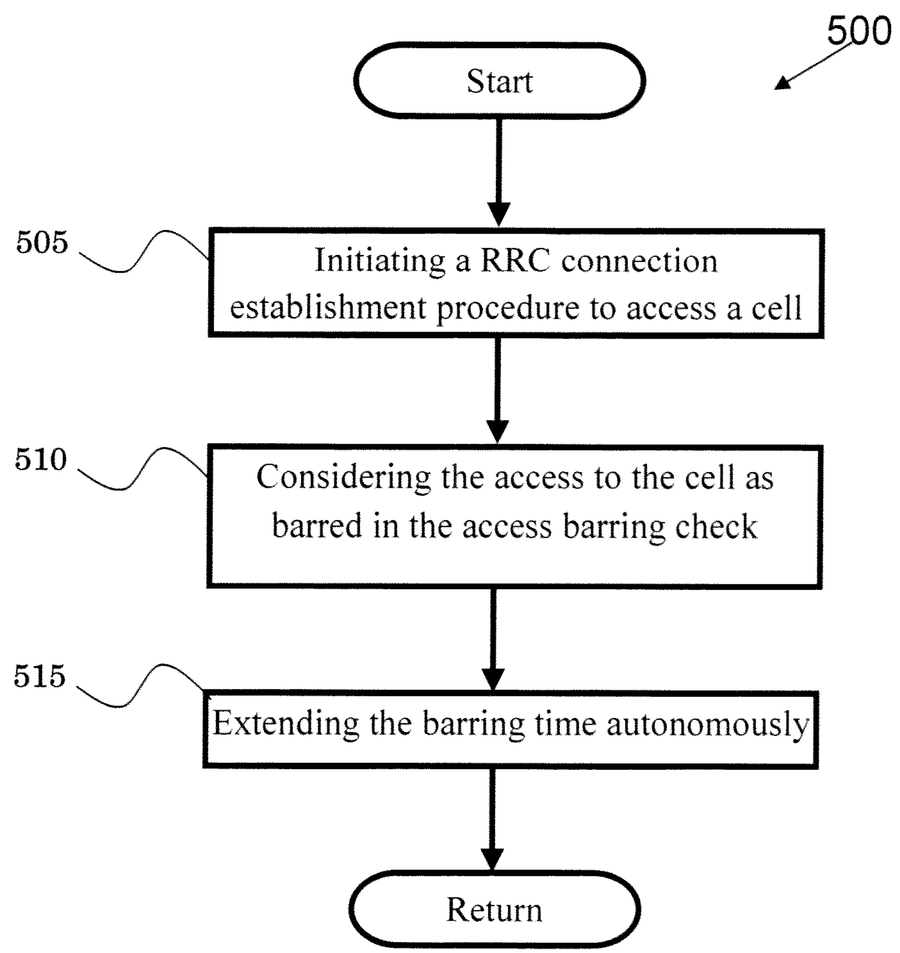
FIGS. 5, 6, 7, 8, 9, 10, 11, and 12 illustrate flow charts in accordance with exemplary embodiments.

In one embodiment, the general concept is that the UE configured with EAB autonomously extends the barring information (e.g., the barring time) when barred by the normal access barring. FIG. 5 illustrates a flow chart 500 in accordance with one exemplary embodiment. In step 505, the UE initiates a RRC (Radio Resource Control) connection establishment procedure to access a cell. In step 510, the UE considers the access to the cell is barred in the access barring check. In one embodiment, the establishment cause is set to delay tolerant in the RRC connection establishment procedure. Besides, the UE is establishing the RRC connection for mobile originating calls. Furthermore, the UE could be a MTC (Machine Type Communication) UE, and is configured with EAB as the functionality to handle RAN overload. In addition, the cell does not support the functionality to handle RAN overload, for example, EAB functionality, and the support of the functionality by a cell is broadcasted by some indication about the RAN overload handling functionality. Also, the UE configured with EAB prioritizes the cell broadcasting the indication during the cell selection/re-selection.

In step 515 of FIG. 5, the UE extends the barring time autonomously. In one embodiment, the UE extends the barring time by enlarging TBarring. In an alternative embodiment, the UE extends the barring time by adding an extra time to the original TBarring. In an alternative embodiment, the UE extends the barring time by scaling up some of the parameters to calculate TBarring, for example, ac-BarringTime.

Figure 6:
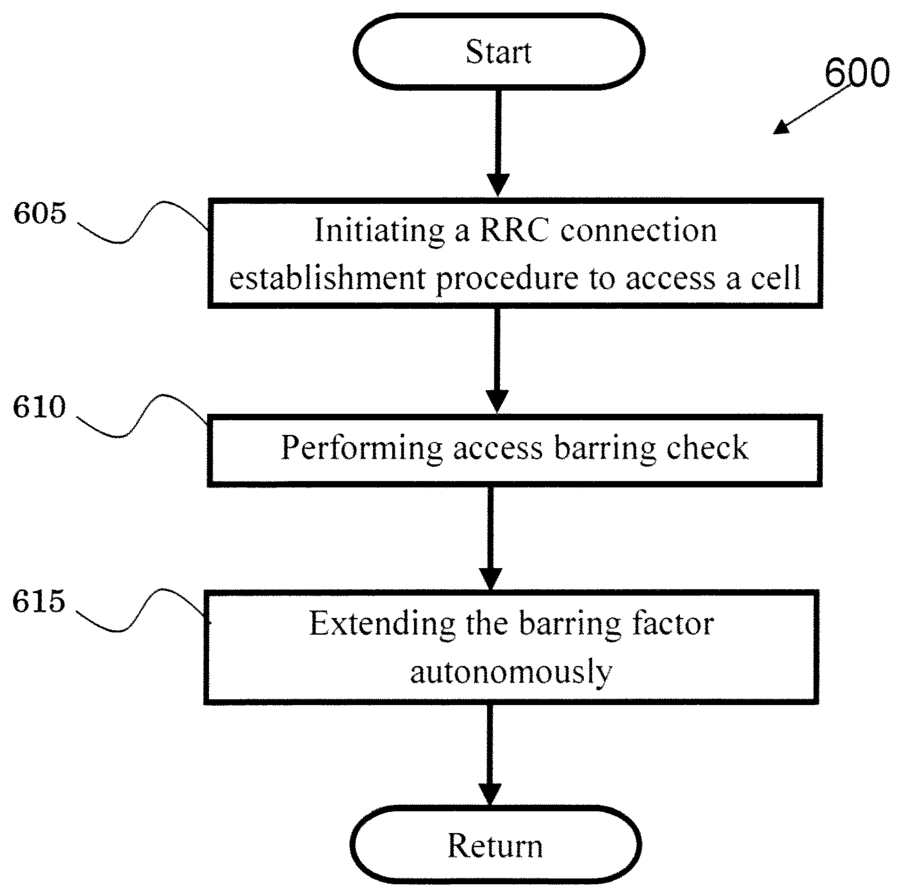

FIG. 6 is a flow chart 600 in accordance with an exemplary alternative embodiment. In step 605, the UE initiates a RRC (Radio Resource Control) connection establishment procedure to access a cell. In step 610, the UE performs an access barring check. In step 615, the UE extends the barring factor autonomously. In one embodiment, the UE extends the barring factor by enlarging ac-BarringFactor.

Figure 7:
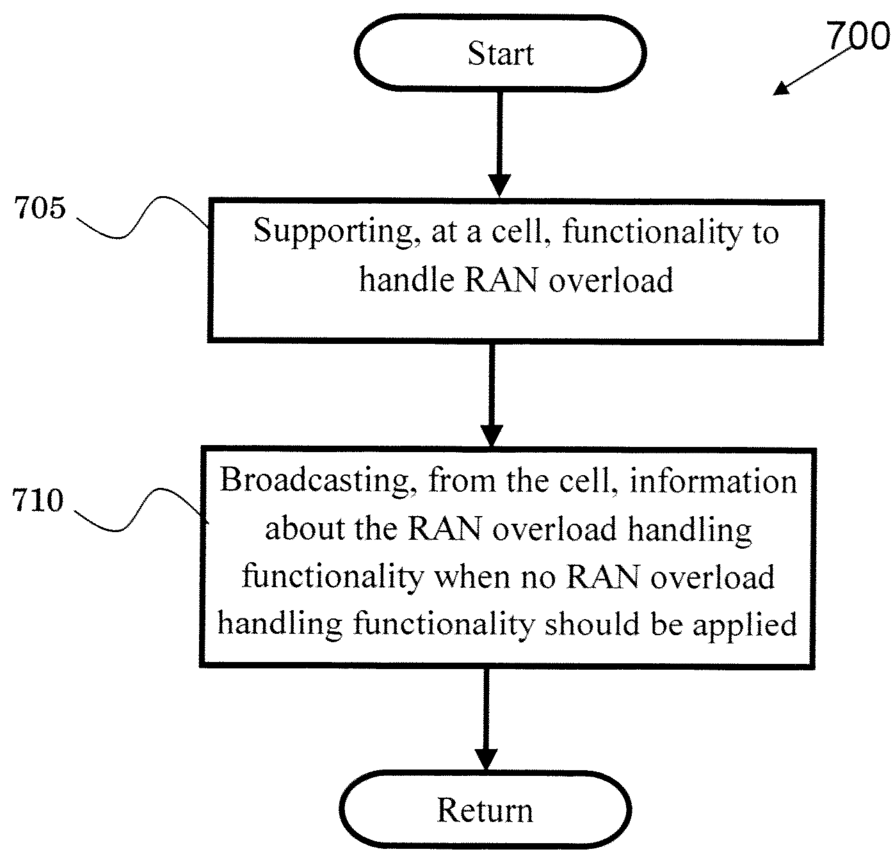

In an alternative embodiment, the general concept is that the cell supporting EAB broadcasts some information when no EAB should be used. Based on the information, the UE could determine whether the cell does not support EAB or does support EAB but no EAB should be used in the meantime. FIG. 7 shows a flow chart 700 in accordance with one exemplary embodiment. In step 705, a cell supports the functionality to handle RAN overload, for example, EAB functionality. In step 710, the cell would broadcast information about the RAN overload functionality (for example. EAB functionality) when no RAN overload handling functionality (for example. EAB functionality) should be applied. In one embodiment, the cell supporting EAB functionality means the cell broadcasts EAB information when EAB should be applied to some or all of the UEs configured with EAB in the cell. Furthermore, a UE configured with EAB prioritizes the cell broadcasting the information during cell selection or reselection. In addition, a UE configured with EAB doesn't select or reselect the cell not broadcasting the information during cell selection or reselection.

Referring back to FIGS. 3 and 4, the UE 300 includes a program code 312 stored in memory 310. In one embodiment, the CPU 308 could execute the program code 312 to (i) initiate a RRC (Radio Resource Control) connection establishment procedure to access a cell, (ii) perform an access barring check during the RRC connection establishment procedure, and (iii) extend a barring time autonomously. In addition, the CPU 308 can execute the program code 312 to perform all of the above-described actions and steps or others described herein.

In addition, when drawing a random number used to compared with a barring factor during access barring check, a UE configured with EAB uses a larger lower bound to draw the random number, (for example, using 0.5 as the lower bound such that 0.5<=random number <1). The UE configured with EAB would have higher probability to be barred by ACB compared with a UE not configured with EAB. In one embodiment, a UE configured with EAB would be barred when a barring factor is set to a value smaller or equal to a specific value. As an example, a UE not configured with EAB may be barred when the barring factor is set to 0, and a UE configured with EAB may be barred when the barring factor is set to smaller or equal to 0.5.

Furthermore, a cell could indicate information about whether a neighbour cell supports EAB or not. One possible usage of the information is that a UE configured with EAB could prioritize the cell supporting EAB during cell reselection. Power consumption could be reduced because the UE does not need to acquire system information from every cell.

Figure 8:
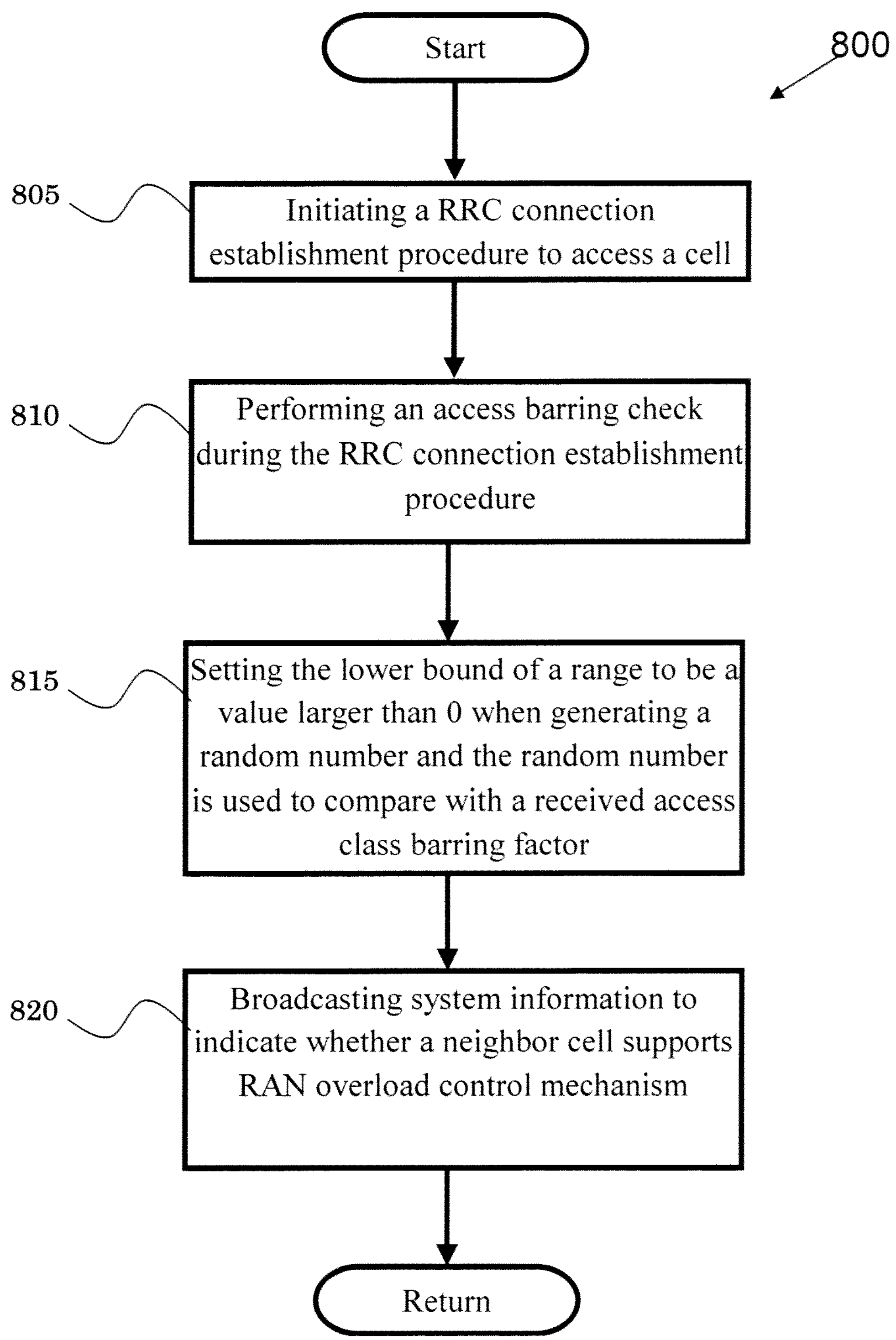

FIG. 8 illustrates a flow chart 800 in accordance with one exemplary embodiment. In step 805, the UE initiates a RRC connection establishment procedure to access a cell. In step 810, the UE performs an access barring check during the RRC connection establishment procedure. In step 815, the UE sets the lower bound of a range to be a value larger than zero (0) when generating (or drawing) a random number, which is used to compare with a received access class barring factor. In one embodiment, the random number could be between zero (0) and one (1). In addition, the access to the cell would not be barred if the random number is lower than the received access class barring factor, and would be barred if the random number is greater than or equal to the received access barring factor. Furthermore, the UE could reduce the received access class barring factor (which could be ac-BarringFactor) autonomously.

In an alternative embodiment, the UE broadcasts system information to indicate whether a neighbor cell supports RAN overload control mechanism (for example, EAB), as shown in step 820. The system information could include an indication as to whether the neighbor cell supports or not support EAB. In addition, the system information could include a list of cells that is used to perform cell selection.

Referring back to FIGS. 3 and 4, the UE 300 includes a program code 312 stored in memory 310. In one embodiment, the CPU 308 could execute the program code 312 to (i) initiate a RRC (Radio Resource Control) connection establishment procedure to access a cell, (ii) perform an access barring check during the RRC connection establishment procedure, (iii) set a lower bound of a range to be a value larger than zero when generating a random number, wherein the random number is used to compare with a received access class barring factor. In addition, the CPU 308 can execute the program code 312 to perform all of the above-described actions and steps or others described herein.

In addition, barring check is currently performed only when a UE performs a RRC connection establishment procedure. And EAB is a type of barring mechanism. So, it seems that EAB would be applied only when a UE performs a RRC connection establishment procedure. However, in Rel-11, it is proposed for RAN2 (Radio Access Network Working Group 2) to further study several aspects about MTC identified by SA (Service and System Aspects). One aspect is to effectively maintain connectivity for a large number of MTC devices, as discussed in 3GPP TS 22.368 V11.1.0. If a large number of MTC devices are kept in connected mode and the MTC devices roam to the same cell when their serving network fails due to a RAN overload, a burst of RRC connection re-establishment procedures (which will initiate Random Access procedures) will be initiated simultaneously by the MTC devices in the selected cell. In this case, RACH (Random Access Channel) resource congestion may occur and EAB cannot solve the problem of RAN overload (such as RACH congestion/contention) because barring check is not performed upon connection re-establishment.

There are several alternatives to handle the RAN overload caused by the UEs initiating RRC connection re-establishment procedures. The first alternative is to apply some barring by restricting some UEs accessing RACH (Random Access Channel) resources of the cell. For example, EAB could be applied when a UE performs a RRC connection re-establishment procedure. More specifically, if a UE with some specific characteristics delay tolerant, or configured with EAB, etc.) initiates a RRC connection re-establishment procedure to a cell indicating that EAB should be applied to the LTE. EAB could be applied for the RRC connection re-establishment procedure.

Figure 9:
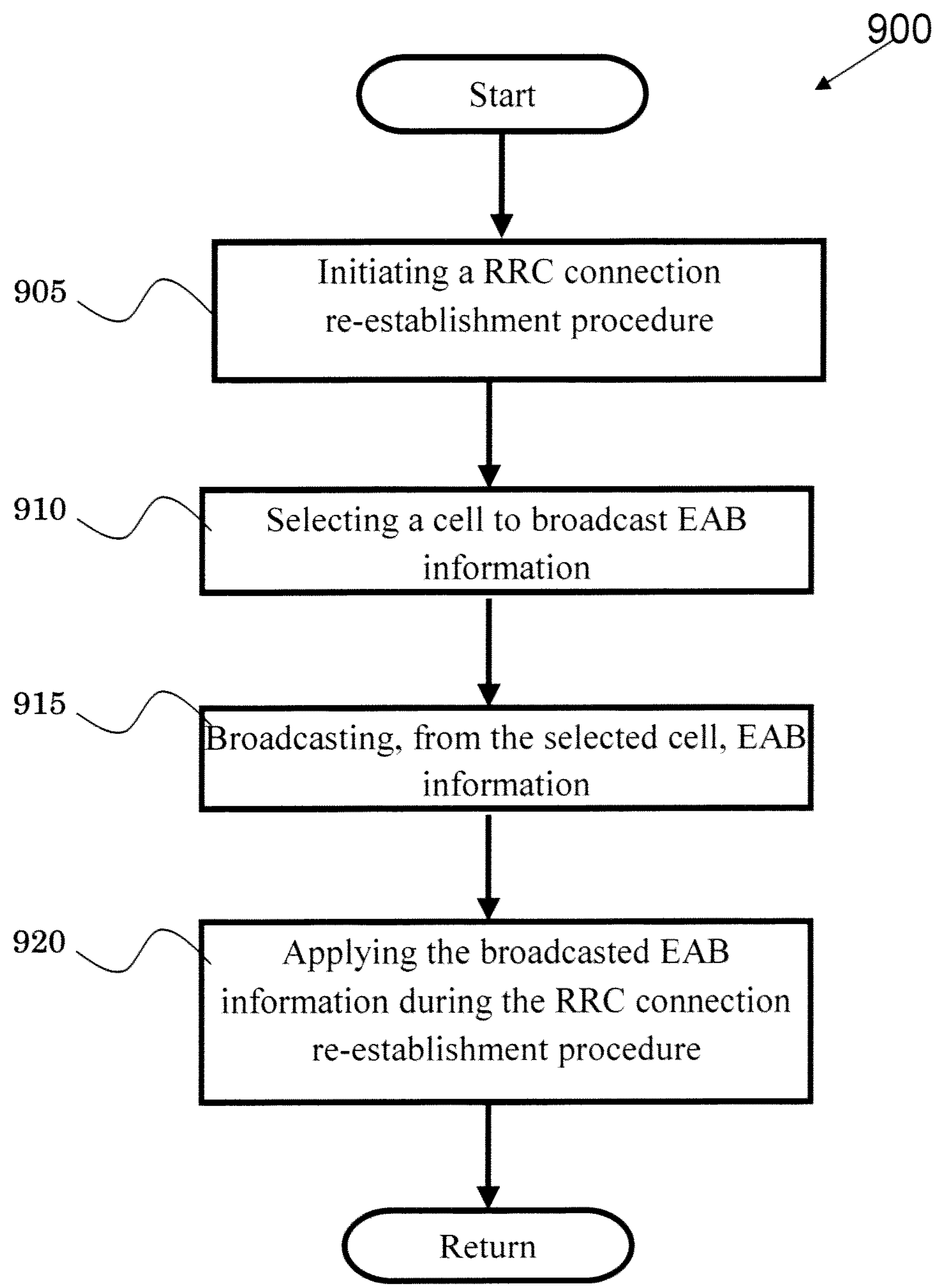

FIG. 9 illustrates a flow chart 900 in accordance with an exemplary alternative embodiment. In step 905, the UE initiates a RRC connection re-establishment procedure. In step 910, a cell is selected in the RRC connection re-establishment procedure to broadcast EAB information. In step 915, the selected cell broadcasts EAB information (such as specific barring information). In step 920, the UE applies the broadcasted EAB information (such as specific barring information) during the RRC connection re-establishment procedure.

The second alternative is that during a RRC connection re-establishment procedure (such as when T311 is running), if the UE with some specific characteristics (e.g. delay tolerant, or configured with EAB, etc.) selects a cell indicating that EAB should be applied to the UE, the UE would enter the idle state. One reason is that the cell may not be prepared.

Figure 10:
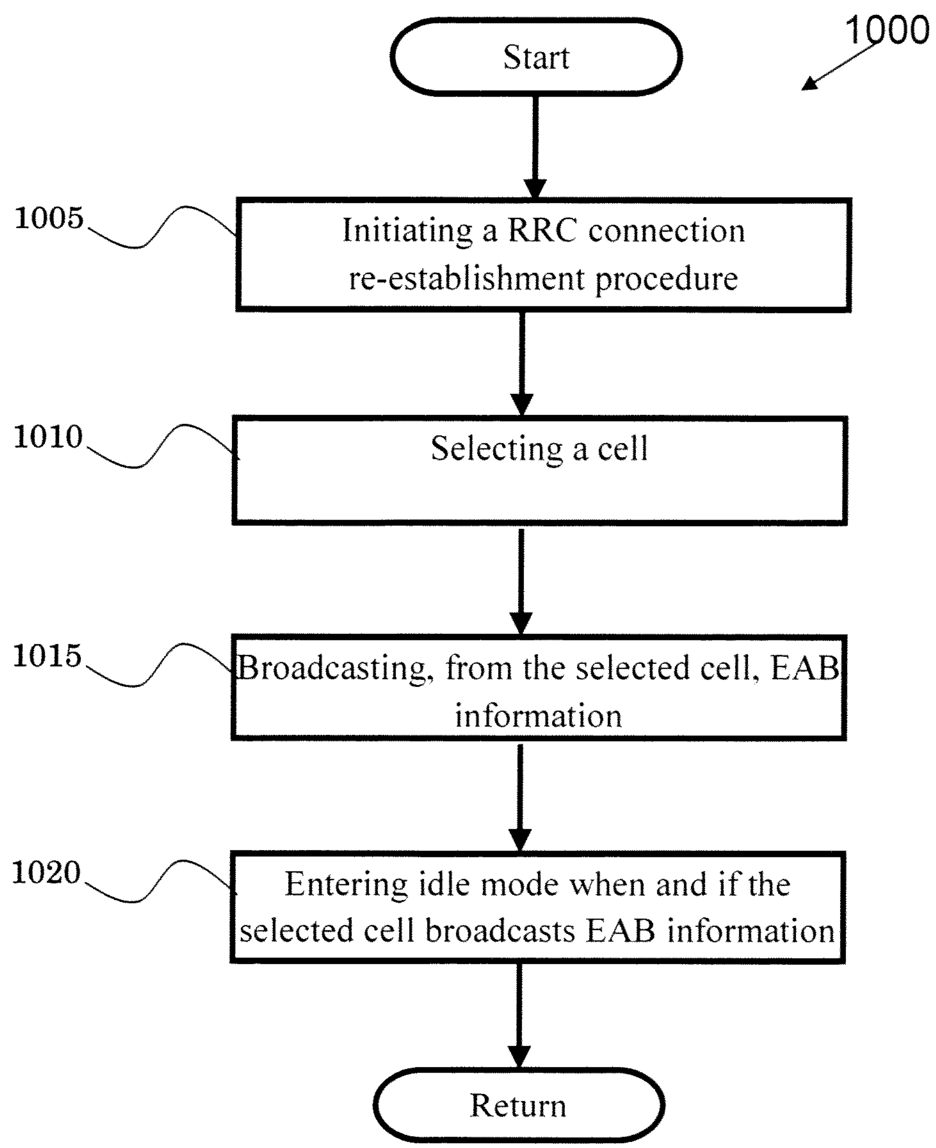

FIG. 10 is a flow chart 1000 in accordance with an exemplary alternative embodiment. In step 1005, the UE initiates a RRC connection re-establishment procedure. In step 1010, a cell is selected in the RRC connection re-establishment procedure. In step 1015, the selected cell broadcasts EAB information (such as specific barring information). In step 1020, the UE enters idle mode when and if the selected cell broadcasts the broadcasted EAB information (such as specific barring information).

The third alternative is that during cell selection of a RRC connection re-establishment procedure (such as when T311 is running), the UE with some specific characteristics (for example, delay tolerant or configured with EAB, etc.) would de-prioritize the cell indicating that EAB should be applied to the UE in the cell selection process. Alternatively, the UE with some specific characteristics (e.g., delay tolerant, or configured with EAB, etc.) could consider the cell indicating that EAB should be applied to the UE as not suitable in the cell selection process.

Figure 11:
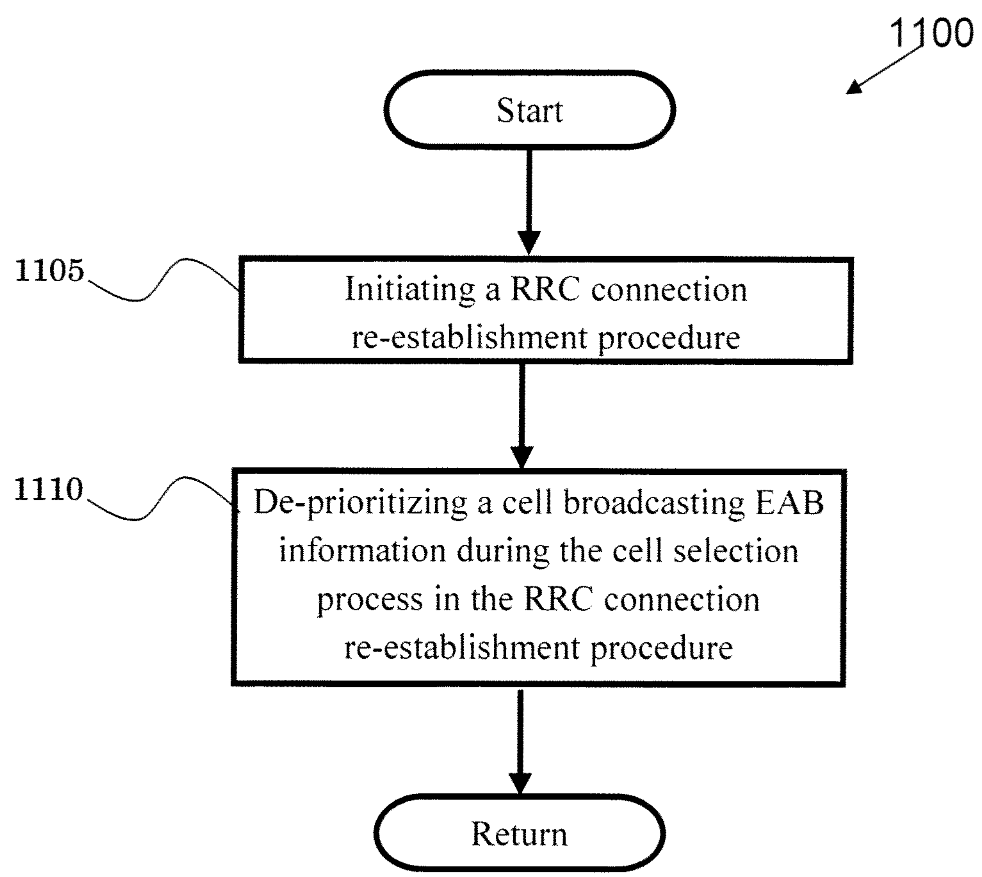

FIG. 11 shows a flow chart 1100 in accordance with an exemplary alternative embodiment. In step 1105, the UE initiates a RRC connection re-establishment procedure. In step 1110, the cell that broadcasts the EAB information (such as specific barring information) is de-prioritized during the cell selection process in the RRC connection re-establishment procedure.

Figure 12:
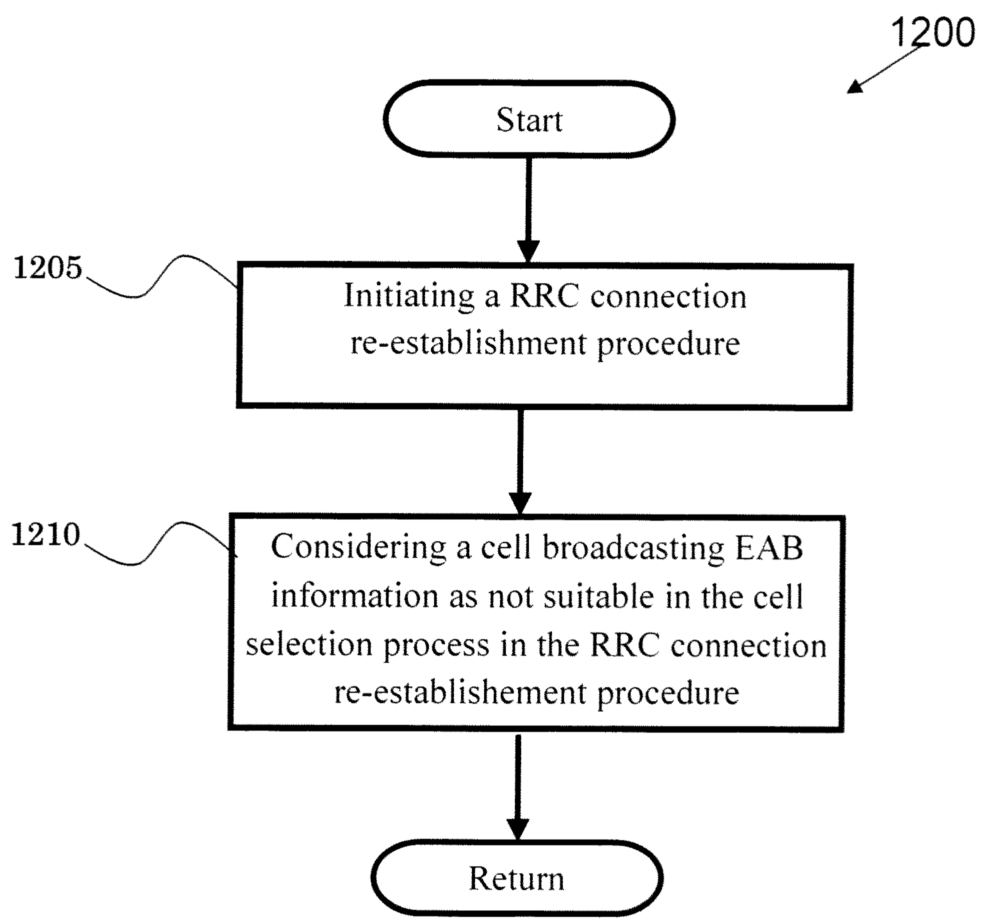

FIG. 12 illustrates a flow chart 1200 in accordance with an exemplary alternative embodiment. In step 1205, the UE initiates a RRC connection re-establishment procedure. In step 1210, the cell that broadcasts the EAB information (such as specific barring information) is considered as not suitable during the cell selection process in the RRC connection re-establishment procedure.

Referring back to FIGS. 3 and 4, the UE 300 includes a program code 312 stored in memory 310. In one embodiment, the CPU 308 could execute the program code 312 to (i) initiate a RRC (Radio Resource Control) connection re-establishment procedure, (ii) select a cell during the RRC connection re-establishment procedure to broadcast EAB (Extended Access Barring) information, (iii) broadcast, from the selected cell, the EAB (Extended Access Barring) information that includes specific barring information, and (iv) applying the specific barring information for the RRC connection re-establishment procedure. In addition, the CPU 308 can execute the program code 312 to perform all of the above-described actions and steps or others described herein.

Various aspects of the disclosure have been described above. It should be apparent that the teachings herein may be embodied in a wide variety of forms and that any specific structure, function, or both being disclosed herein is merely representative. Based on the teachings herein one skilled in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. As an example of some of the above concepts, in some aspects concurrent channels may be established based on pulse repetition frequencies. In some aspects concurrent channels may be established based on pulse position or offsets. In some aspects concurrent channels may be established based on time hopping sequences. In some aspects concurrent channels may be established based on pulse repetition frequencies, pulse positions or offsets, and time hopping sequences.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, processors, means, circuits, and algorithm steps described in connection with the aspects disclosed herein may be implemented as electronic hardware (e.g. a digital implementation, an analog implementation, or a combination of the two, which may be designed using source coding or some other technique), various forms of program or design code incorporating instructions (which may be referred to herein, for convenience, as "software" or a "software module"), or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

In addition, the various illustrative logical blocks, modules, and circuits described in connection with the aspects disclosed herein may be implemented within or performed by an integrated circuit ("IC"), an access terminal, or an access point. The IC may comprise a general purpose processor, a digital signal processor (DSP), an application specific integrated circuit (ASIC), a field programmable gate array (FPGA) or other programmable logic device, discrete gate or transistor logic, discrete hardware components, electrical components, optical components, mechanical components, or any combination thereof designed to perform the functions described herein, and may execute codes or instructions that reside within the IC, outside of the IC, or both. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

It is understood that any specific order or hierarchy of steps in any disclosed process is an example of a sample approach. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

The steps of a method or algorithm described in connection with the aspects disclosed herein may be embodied directly in hardware, in a software module executed by a processor, or in a combination of the two. A software module (e.g., including executable instructions and related data) and other data may reside in a data memory such as RAM memory, flash memory, ROM memory, EPROM memory, EEPROM memory, registers, a hard disk, a removable disk, a CD-ROM, or any other form of computer-readable storage medium known in the art. A sample storage medium may be coupled to a machine such as, for example, a computer/processor (which may be referred to herein, for convenience, as a "processor") such the processor can read information (e.g., code) from and write information to the storage medium. A sample storage medium may be integral to the processor. The processor and the storage medium may reside in an ASIC. The ASIC may reside in user equipment. In the alternative, the processor and the storage medium may reside as discrete components in user equipment. Moreover, in some aspects any suitable computer-program product may comprise a computer-readable medium comprising codes relating to one or more of the aspects of the disclosure. In some aspects a computer program product may comprise packaging materials.

While the invention has been described in connection with various aspects, it will be understood that the invention is capable of further modifications. This application is intended to cover any variations, uses or adaptation of the invention following, in general, the principles of the invention, and including such departures from the present disclosure as come within the known and customary practice within the art to which the invention pertains.

What is claimed is:

1. A method for a UE (User Equipment) to prevent RAN (Radio Access Network) overload, comprising:

initiating a RRC (Radio Resource Control) connection re-establishment procedure;

selecting a cell during the RRC connection re-establishment procedure, wherein the cell broadcasts EAB (Extended Access Barring) information indicating that EAB should be applied to the UE; and applying the EAB information for the RRC connection re-establishment procedure.

2. The method of claim 1, wherein the UE is delay tolerant.

3. The method of claim 1, wherein the UE is configured with EAB.

4. The method of claim 1, wherein the UE is in connected mode.

5. The method of claim 1, wherein the UE enters idle mode if the cell broadcasts the EAB information.

6. A method for a UE (User Equipment) to prevent RAN (Radio Access Network) overload, comprising:

Initiating a RRC (Radio Resource Control) connection re-establishment procedure; and de-prioritizing a cell that broadcasts EAB (Extended Access Barring) information during a cell selection process of the RRC connection re-establishment procedure.

7. The method of claim 6, wherein the UE is delay tolerant.

8. The method of claim 6, wherein the UE is configured with EAB.

9. The method of claim 6, wherein the UE is in connected mode.

10. The method of claim 6, wherein the EAB information indicates that EAB should be applied to the UE.

11. A communication device for a UE (User Equipment) to prevent RAN (Radio Access Network) overload, the communication device comprising:

a control circuit;

a processor installed in the control circuit;

a memory installed in the control circuit and operatively coupled to the processor;

wherein the processor is configured to execute a program code stored in memory to enable the UE to prevent RAN overload by:

initiating a RRC (Radio Resource Control) connection re-establishment procedure;

selecting a cell during the RRC connection re-establishment procedure, wherein the cell broadcasts EAB (Extended Access Barring) information indicating that EAB should be applied to the UE; and applying the EAB information for the RRC connection re-establishment procedure.

12. The communication device of claim 11, wherein the UE is delay tolerant.

13. The communication device of claim 11, wherein the UE is configured with EAB.

14. The communication device of claim 11, wherein the UE is in connected mode.

15. The communication device of claim 11, wherein the UE enters idle mode if the cell broadcasts the EAB information.

16. A communication device for a UE (User Equipment) to prevent RAN (Radio Access Network) overload, the communication device comprising:

a control circuit;

a processor installed in the control circuit;

a memory installed in the control circuit and operatively coupled to the processor;

wherein the processor is configured to execute a program code stored in memory to enable the UE to prevent RAN overload by:

initiating a RRC (Radio Resource Control) connection re-establishment procedure; and de-prioritizing a cell that broadcasts EAB (Extended Access Barring) information during a cell selection process of the RRC connection re-establishment procedure.

17. The communication device of claim 16, wherein the UE is delay tolerant.

18. The communication device of claim 16, wherein the UE is configured with EAB.

19. The communication device of claim 16, wherein the UE is in connected mode.

20. The communication device of claim 16, wherein the EAB information indicates that EAB should be applied to the UE.

* * * * *